United States Patent
Denteneer et al.

(10) Patent No.: US 10,045,274 B2
(45) Date of Patent: Aug. 7, 2018

(54) METHOD AND APPARATUS FOR PROPAGATING AND MAINTAINING UPDATE INFORMATION

(71) Applicant: PHILIPS LIGHTING HOLDING B.V., Eindhoven (NL)

(72) Inventors: Theodorus Jacobus Johannes Denteneer, Eindhoven (NL); Marc Aoun, Eindhoven (NL); Thomas Meyfroyt, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 161 days.

(21) Appl. No.: 15/123,407

(22) PCT Filed: Feb. 25, 2015

(86) PCT No.: PCT/EP2015/053864
§ 371 (c)(1),
(2) Date: Sep. 2, 2016

(87) PCT Pub. No.: WO2015/132098
PCT Pub. Date: Sep. 11, 2015

(65) Prior Publication Data
US 2017/0070942 A1    Mar. 9, 2017

(30) Foreign Application Priority Data
Mar. 5, 2014  (EP) .................................... 14157848

(51) Int. Cl.
*H04W 40/02*       (2009.01)
*H04W 40/24*       (2009.01)
*H04L 12/751*      (2013.01)
*H04W 84/12*       (2009.01)
*H04W 84/18*       (2009.01)

(52) U.S. Cl.
CPC ........... *H04W 40/023* (2013.01); *H04L 45/02* (2013.01); *H04W 40/248* (2013.01); *H04W 84/12* (2013.01); *H04W 84/18* (2013.01)

(58) Field of Classification Search
CPC .......... G07C 5/008; G06F 19/00; H04L 7/00; H04L 12/751; H04L 25/0262; H04W 40/02
See application file for complete search history.

(56) References Cited

U.S. PATENT DOCUMENTS

| | | | | |
|---|---|---|---|---|
| 5,425,061 | A | * 6/1995 | Laczko, Sr. ......... | H04L 25/0262 370/465 |
| 2011/0208386 | A1 | * 8/2011 | Jiang ..................... | G07C 5/008 701/31.4 |
| 2013/0022084 | A1 | 1/2013 | Vasseur et al. | |

OTHER PUBLICATIONS

Stephen Brown et al, "Software Updating in Wireless Sensor Networks: A Survey and Lacunae", J. Sens. Actuator Netw. 2013, 2, pp. 717-760; doi: 10.3390/jsan2040717.

(Continued)

*Primary Examiner* — Andrew Lai
*Assistant Examiner* — Leon Andrews

(57) ABSTRACT

The invention proposes an improvement to increase the speed at which a Trickle algorithm can propagate update information in a multi-hop network, while still controlling the number of redundant transmissions and ensuring scalability of the algorithm. It does this by intelligently adapting the size of a listen-only period (t1, t2), depending on the fact if a node has recently received an update or not.

11 Claims, 3 Drawing Sheets

(56) References Cited

OTHER PUBLICATIONS

Badis Djamaa et al, "Enhancing Delay-based Packet Forwarding Schemes in Wireless Sensor Networks", 2013 4th Annual International Conference on Energy Aware Computing Systems and Applications (ILEAC) pp. 12-17.

* cited by examiner

METHOD AND APPARATUS FOR PROPAGATING AND MAINTAINING UPDATE INFORMATION

CROSS-REFERENCE TO PRIOR APPLICATIONS

This application is the U.S. National Phase application under 35 U.S.C. § 371 of International Application No. PCT/EP2015/053864, filed on Feb. 25, 2015, which claims the benefit of European Patent Application No. 14157848.4, filed on Mar. 5, 2014. These applications are hereby incorporated by reference herein.

FIELD OF THE INVENTION

The invention relates to the field of a apparatus and method for propagating and maintaining update information in a wireless network, such as but not limited to meshed networks of wirelessly interconnected lighting devices.

BACKGROUND OF THE INVENTION

Meshed networks of wirelessly interconnected lighting poles or other lighting devices, sensor devices, or load devices will become the infra-structure for smart city or housing services such a light management, traffic management, and air quality monitoring. City wide networks may consist of tens of thousands of lighting poles that relay traffic via multi-hop communication protocols. The size of these networks makes their deployment an undertaking which challenges the current state of the art in network design and networking protocols.

Similarly wirelessly connected lighting networks will provide easy to install and energy efficient lighting within professional and residential buildings. Additional benefits of such lighting networks are in lighting management and data-based services.

In such networks, data must be routed along multi-hop paths between nodes in the lighting poles and the coordinator node. As the networking nodes are resource (memory) constrained, routing protocols based on flooding are needed.

For lighting use cases, the propagation speed of the broadcasting algorithm is of paramount importance. Indeed, lights must switch on with imperceptible delay, e.g. within 200 ms, and with great synchronicity (e.g. 50 ms). This requirement is not necessarily encountered in other applications in the building automation context. E.g., in heating, ventilation and air conditioning (HVAC) applications, there may be considerable time lag between an event actuation and its noticeable effect. This explains the focus of latency of the multicast within lighting systems, and the emphasis this topic receives in the various (IETF) standardization and (Chip vendor) business contacts.

A specific flooding algorithm, called Trickle, has recently been introduced by the internet engineering task force (IETF) for its suitability in this context. The Trickle algorithm is based on stochastic timers and a window doubling mechanism to balance traffic load and response times.

P. Levis et al: "Trickle: A Self-Regulating Algorithm for Code Propagation and Maintenance in Wireless Sensor Networks", University of California, Berkeley, discloses the Trickle algorithm as a suitable protocol for effective and efficient distribution and maintenance of code or other information in wireless sensor networks. The Trickle algorithm is currently being investigated for multicast communication in wireless indoor lighting networks, and in meshed networks of interconnected lighting poles.

More specifically, the Trickle algorithm is based on three parameters:

A threshold value k, called the redundancy constant;
the maximum interval size $\tau_h$; and
the minimum interval size $\tau_l$.

Furthermore each node in the network has its own timer and keeps track of three variables:

The current interval size $\tau$;
a count value c of a counter counting the number of messages heard during an interval;
a broadcasting time t during the current interval.

The behaviour of each node can be described by the following set of rules:

1) At the start of a new interval a node resets its timer and counter and sets the broadcasting time t to a value in the range [$\tau/2$, $\tau$] at random.
2) When a node hears a consistent message that is consistent with the information it has, it increments the count value c of the counter by 1.
3) When a node's timer hits the broadcast time t, the node broadcasts its message if c<k.
4) When a node's timer hits the end of the interval size $\tau$, it doubles its interval size $\tau$ up to $\tau_h$ and starts a new interval.
5) When a node hears a message that is inconsistent with the information it has, if $\tau > \tau_l$, it sets $\tau$ to $\tau_l$ and starts a new interval, otherwise it does nothing.

What constitutes a consistent or an inconsistent message, can be determined by the user and depends on the setting and/or application in which the algorithm is used. Also additional actions, like what happens when a node hears an inconsistency, can be defined. In general, an inconsistent message can be defined as a message that contains update information which differs from update information currently maintained or available at a concerned node. If the algorithm is used for example to propagate new code, an inconsistent message can be defined as code that has a version number higher or lower than the version number of the code the node currently has. An additional action can then be defined as that a node should update its code when it hears newer code. In the lighting context, the messages may typically be switch and dimming commands.

The above mentioned rule 1 of the Trickle algorithm makes nodes set their timers in the second part of their intervals. This rule ensures that nodes listen for at least the first half of their interval, the so-called listen-only period. This rule was introduced to decrease the number of redundant transmissions in a network. These redundant messages are caused by nodes that listen only for a short period. It is known that without this rule, the number of messages in a network grows with the number of nodes in the network, at a rate given by the square root of the number of nodes. With the rule, the number of messages is bounded and independent of the number of nodes in the network. Thus, this simple rule increases the scalability of the algorithm.

However, this rule also has an undesirable effect on the speed at which an update can be propagated in a multi-hop network. Whenever a node receives an update, it has to wait for at least a period of $\tau_l/2$, before it can retransmit the newly received update. Consequently in a h-hop network communication delay is bounded by below by $h*\tau_l/2$.

For example, assuming a lossless network consists of 80×80 nodes placed on a grid. In case of instantaneous transmissions, broadcasting nodes cannot interfere with each other. Furthermore $\tau_l$=30 ms, $\tau_h$=480 ms and k=1. The expected hop count from corner to corner is approximately 26 hops. At time 0, a node in the upper left corner receives an update which it starts to propagate. It can be seen that in such a 26-hop network communication delay is approximately 490 ms, since after each hop nodes have to wait for at least 15 ms before they can propagate the newly received update.

In case the nodes do not have a listen-only period, they can set their broadcasting times t uniformly from the range $[0, \tau]$. Thereby, propagation speed increases drastically by a factor of approximately 13. It is also worth noting that for this setting the update appears to spread through the network less predictably.

Hence, not having a listen-only period gives much faster propagation, however it is also known that this setting may lead to lots of redundant transmissions. This invention allows the Trickle algorithm to benefit from the advantages of both settings, drastically increasing propagation speed in multi-hop networks, while still controlling the number of transmissions when no new information is available in the network.

SUMMARY OF THE INVENTION

It is an object of the present invention to provide an information propagation system, by means of which the propagation speed of an update in a multi-hop network can be increased while still controlling the number of redundant transmissions, thereby ensuring scalability.

This object is achieved by an apparatus as claimed in claim 1, by a network node as claimed in claim 8, by a mesh network as claimed in claim 9, by a method as claimed in claim 10, and by a computer program product as claimed in claim 11.

Accordingly, the minimum size of the first predetermined time period (i.e., listening-only period) is adjusted in dependence on the receipt of an inconsistent message. Thereby, the speed at which an update can be propagated in a multi-hop network can be strongly increased, while still controlling the number of redundant transmissions and ensuring scalability of the algorithm. More specifically, the size of the listen-only period is intelligently adapted depending on the fact if a node has recently received an update or not. This ensures that when a new update is in the network it is propagated quickly by having a small listen-only period and when there is no new update in the network the number of messages per interval can be controlled by having a large listen-only period.

According to a first option, the second predetermined time period may be set, e.g. by the transmission controller, to a minimum time period and a new second predetermined time period may be started in response to the receipt of the inconsistent message, and the size of the second predetermined time period may be doubled up to a maximum time period and a new second predetermined time period may be started, if the end of the second predetermined time period has been reached. Thereby, traffic load and response times of update information propagation can be balanced.

According to a second option which can be combined with the first option, the minimum size of the first predetermined time period may be set to zero if the second predetermined time period is set to the minimum time period. This option provides a simple solution to increase update propagation time while still controlling the number of redundant transmissions.

According to a third option which can be combined with the first or second option, the minimum size of the first predetermined time period may be set to half of the size of the second predetermined time period if the second predetermined time period is set to a value larger than the minimum time period. This measure ensures that the number of update messages per interval (i.e., second predetermined time period) is controlled by having a large listen-only period (i.e., first predetermined time period) when there is no new update in the network.

According to a fourth option which can be combined with any one of the above first to third options, the minimum size of the first predetermined time period may be set to a value which corresponds to the size of the second predetermined time period multiplied by a size parameter at the start of a new second predetermined time interval, wherein the size parameter may be set to zero in response to the receipt of the inconsistent message, wherein the size parameter may be incremented by a predetermined value up to a maximum value less than or equal to one, if the end of the second predetermined time period has been reached. This option provides a more refined solution to the above problem, where the size of the listen-only period (i.e., first predetermined period) is gradually increased along with the size of the node's interval (i.e., second predetermined period).

According to a specific example of the fourth option, the maximum value may be set to 0.5 and the predetermined value may be calculated based on the equation $\delta=1/(2 \log_2(\tau_h/\tau_l))$, wherein $\delta$ designates said predetermined value, wherein $\tau_h$ designates the maximum time period and $\tau_l$ designates the minimum time period.

It is noted that the above apparatus may be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the apparatus of claim 1, the network node of claim 8, the mesh network of claim 9, the method of claim 10, and the computer program product of claim 11 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a system which can be used to control lights in wireless lighting networks, both indoor and outdoor and ensures that lighting commands are propagated with imperceptible delays, even in large lighting networks.

Figure 1:
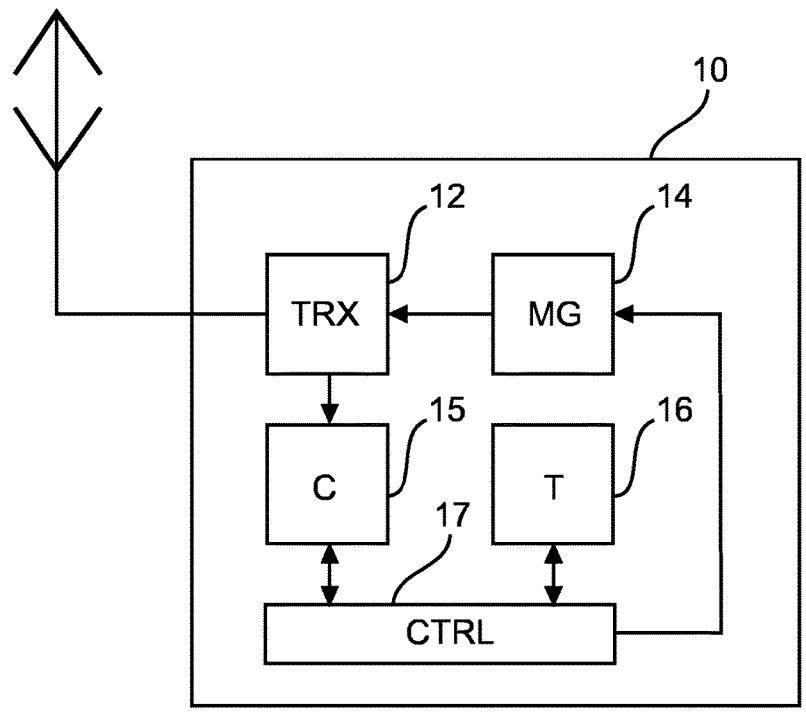
FIG. 1 shows a schematic block diagram of a network node according to a first embodiment.

FIG. 1 shows a schematic block diagram of a network node 10 according to a first embodiment. The network node 10 is a wireless node with a transceiver (TRX) 12 for transmitting and receiving wireless messages via a transmission/reception antenna. A counter (C) 15 is adapted to determine and count consistent messages received by the transceiver 12. Such consistent messaged are message containing update information (e.g. code, protocol, state, status, version etc.) which is consistent with the update information maintained at the network node. Additionally, a timer 16 is provided for counting a listen-only interval and a node interval which are selected and set by a transmission controller 17. The transmission controller 17 controls a message generator 14 to transmit (e.g. broadcast) a node-specific update message containing update information which reflects the status of the node 10 via the transceiver 12.

The transmission controller 17 of the first embodiment operates in line with the initially described rules 2 to 5 of the Trickle algorithm. However, the initially described rule 1 is changed by adapting the size of the listen-only period depending on the fact if the node 10 has recently received an update (i.e. inconsistent update message) or not. Thereby, the speed at which the Trickle algorithm can propagate an update in a multi-hop network is increased, while still controlling the number of redundant transmissions, ensuring scalability of the algorithm. This ensures that when a new update (i.e. inconsistent update message) is in the network it is propagated quickly by having a small listen-only period, and when there is no new update (i.e. only consistent update messages) in the network, the number of messages per interval is controlled by having a large listen-only period. The above functionalities of the node 10 can be implemented by concrete hardware circuits or based on software routines controlling a processor device.

Figure 2:
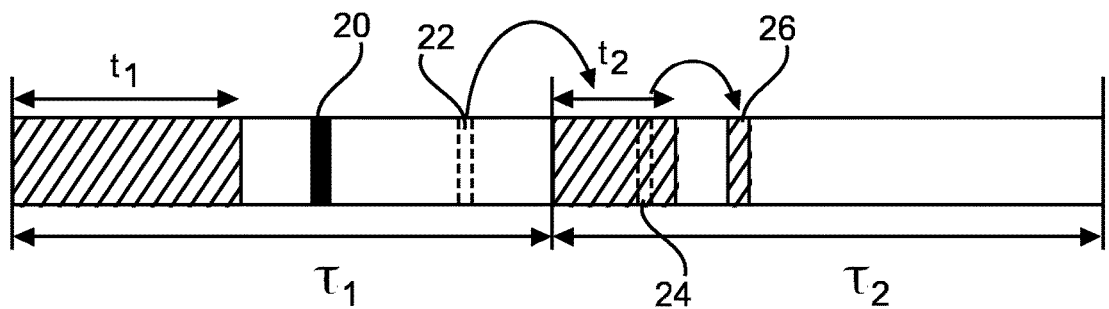
FIG. 2 shows a schematic time diagram indicating control of a listen-only interval according to the first embodiment.

FIG. 2 shows a schematic time diagram indicating control of a listen-only interval according to the first embodiment. In FIG. 2, the horizontal line corresponds to the time dimension, wherein two node intervals τ1 and τ2 of different size are shown. The first node interval τ1 starts with a listen-only period t1 of a size selected from a range between a predefined minimum size and a predefined maximum size. Since no inconsistent or consistent update message has been received during the listen-only period t1 of the first node interval τ1, the transmission controller 17 controls the message generator 14 to broadcast an own update message 20. Then, at a later time during the first node interval τ1, an inconsistent update message 22 is received. In response thereto, the transmission controller 17 starts a new node interval (second node interval) τ2 at the timer 16, reduces this node interval to the minimum interval size $\tau_l$, and reduces the minimum size of the range from which the next listen-only interval t2 can be selected. In the case of FIG. 2, this results in a selection of a smaller listen-only interval t2 during the second node interval τ2. During this second listen-only interval t2, a consistent update message 24 is received and counted by the counter 15. Consequently, the transmission of the own broadcast update message 26 after the end of the second listen-only period t2 is suppressed (as indicated by the hatched bar in FIG. 2).

Figure 3:
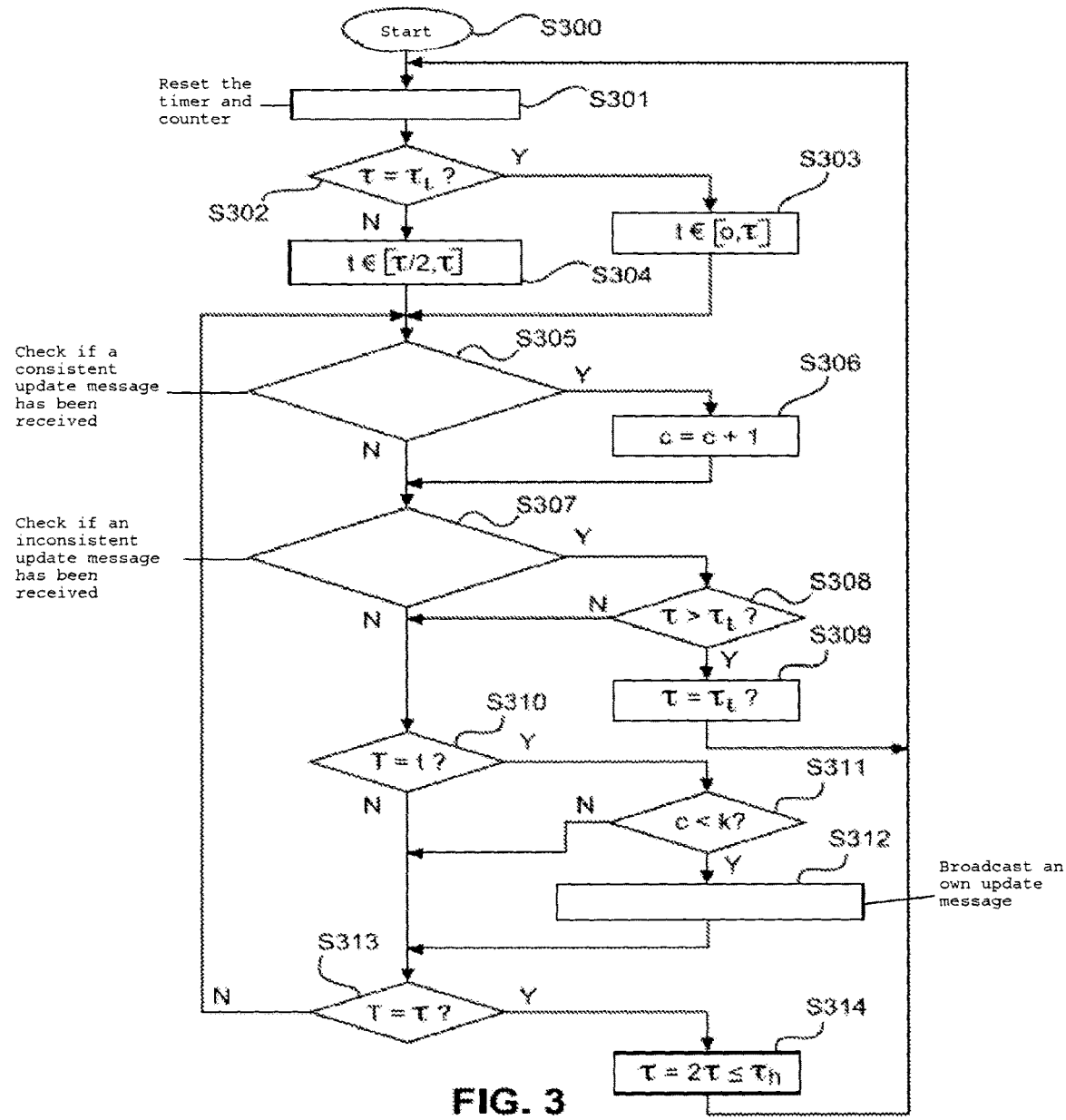
FIG. 3 shows a schematic flow diagram of an information propagating and maintaining procedure according to a second embodiment.

FIG. 3 shows a schematic flow diagram of an information propagating and maintaining procedure according to a second embodiment.

In this simple form of the proposed propagation control scheme, rule 1 of the initially described Trickle algorithm is replaced by the rule that, at the start of a new node interval τ, a node resets its timer and counter. Furthermore, if the smallest node interval $\tau=\tau_l$ was set, the node sets the listen-only period t to a value from the range [0, τ] at random. Thus, the minimum size of the range from which the next listen-only interval t can be selected is set to zero. Otherwise, it sets the listen-only interval t to a value from the range [τ/2, τ] at random.

The flow diagram of FIG. 3 starts with step S300. Then, in step S301, the timer and the counter are reset and it is checked in step S302 whether the node interval τ is currently set to the minimum node interval $\tau_l$. If so, the procedure branches off to step S303 where the listen-only interval t is set to a value randomly selected from a range between zero and the current node interval τ. Thus, the minimum size of the listen-only interval t is set to zero. Otherwise, if it is determined in step S302 that the current node interval t is larger than the minimum node interval $\tau_l$, then the procedure continues with step S304 where the listen-only interval t is set to a value randomly selected from a range between τ/2 and the current node interval τ. Thus, the minimum size of the listen-only interval t is set to τ/2.

Thereafter, it is checked in step S305 whether a consistent update message has been received. If so, the procedure branches off to step S306 where the count value of the consistent message counter (e.g. counter 15 in FIG. 1) is incremented by one. Otherwise, if it is determined in step S305 that no consistent update message has been received, then the procedure continues with step S307 where it is checked whether an inconsistent update message has been received. If so, the procedure branches off to step S308 where it is checked whether the current node interval τ is larger than the minimum node interval $\tau_l$. If so, the current node interval τ is set to the minimum node interval $\tau_l$ in step S309. Then, the procedure jumps back to step S301 and a new node interval τ is started. Otherwise, if it is determined in step S307 that no inconsistent update message has been received, then the procedure continues with step S310 where it is checked whether the end of listen-only interval t has been reached. If so, the procedure branches off to step S311 where it is checked whether the count value of consistent messages is smaller than a predetermined value k (e.g. k=1). If so, an own update message is broadcast in step S312 and the procedure continues with step S313. Otherwise, if it is determined in step S311 that the count value of consistent messages is not smaller than the predetermined value k, then the procedure directly continues with step S313. In step S313 is checked whether the end of the current node interval τ has been reached. If not, the procedure branches back to step S305 and repeats the checking operations. Otherwise, if it is determined in step S313 that the end of the current node interval t has been reached, the procedure continues with step S314 where the node interval τ is doubled up to the maximum node interval $\tau_h$. Then, the procedure jumps back to step S301 and a new node interval is started.

In the following, a more refined version of the proposed propagation control is described in connection with a third embodiment where the size of the listen-only period t gradually increased along with the size of the node interval τ.

Figure 4:
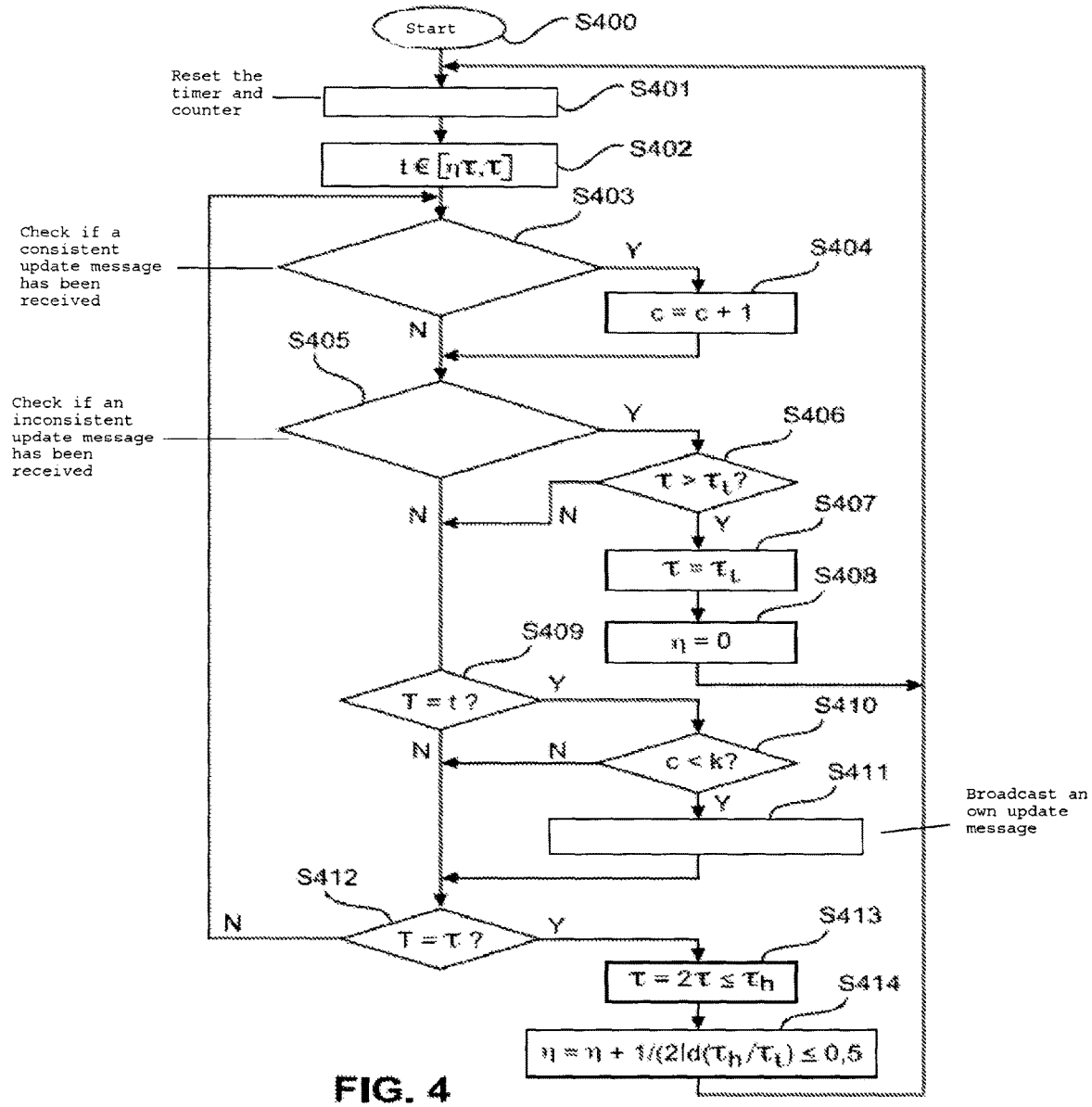
FIG. 4 shows a schematic flow diagram of an information propagating and maintaining procedure according to a third embodiment.

FIG. 4 shows a schematic flow diagram of an information propagating and maintaining procedure according to the third embodiment. Here, each node keeps track of an additional size parameter η, defining the size of the listen-only period t, and rules 1, 4 and 5 of the initially described Trickle algorithm are modified as explained below.

In FIG. 4, steps S401, S403-S407 and S409-S413 correspond to steps S301 and S305-S314, respectively. Therefore these steps are not explained again here.

However, contrary to the second embodiment, after the reset of timer and counter values in step S401, the listen-only interval t is randomly selected in a new step S402 from a range between $\eta\tau$ and the current node interval $\tau$. Thus, the minimum size of the listen-only interval t is set to $\eta\tau$.

Furthermore, at step S405 (which corresponds to step S307 of FIG. 3), it is checked whether an inconsistent update message has been received. If so, the procedure branches off to step S406 where it is checked whether the current node interval $\tau$ is larger than the minimum node interval $\tau_l$. If so, the current node interval $\tau$ is set to the minimum node interval $\tau_l$ in step S407 and then a new step S408 is introduced, where the new size parameter is set to zero. This leads to the result that the minimum size of the listen-only interval t is also set to zero. However, contrary to the second embodiment, the minimum size of the listen-only interval t is now gradually increased based on a successively changed value of the size parameter $\eta$.

Additionally, when it is determined in step S412 (which corresponds to step S313 in FIG. 3) that the node's timer has reached the end of the node interval z, the size of the node interval $\tau$ is doubled in step S413 up to the maximum node interval $\tau_h$ (which corresponds to step S314 in FIG. 3). Then, a new step S414 is introduced, where the size parameter $\eta$ is incremented by $1/(2 \log_2(\tau_h/\tau_l))$ up to 0.5 and then a new node interval is started.

The flow diagrams of FIGS. 3 and 4 may by the basis for software routines controlling the transmission controller 17 of the node 10 shown in FIG. 1 so as to provide the functionality of the second and third embodiments.

In Table 1 below, simulation results for three variants of the Trickle algorithm are compared. Namely, the proposed enhanced procedure according to the above second embodiment, a procedure based on the standardized Trickle algorithm as initially described, and a procedure based on an algorithm without the listen-only period. A network has been simulated where nodes are placed on a grid of size 50 times 50. It is assumed that interval skew is uniformly distributed and nodes have a broadcasting range of 4 hops. All nodes are perfect transmitters and receivers. All nodes have $\tau=\tau_h=480$ ms, and k=1. At time 0, one of the corner nodes receives an update and resets its interval length $\tau$ to $\tau_l=30$ ms and starts to propagate the update. The time until full consistency of the network has then been measured. Furthermore, the average number of transmissions per time unit during the propagation event has been measured. Moreover, the average number of messages sent per time unit after the propagation event has ended has been measured, i.e. $\tau=\tau_h$ for all nodes. The average has been determined over 500 simulations.

| Variant | Standard | No listen only period | Proposed |
| --- | --- | --- | --- |
| Time until consistency | 447 | 73.8 | 76.8 |
| Transmissions per time unit during propagation event | 24.9 | 99.2 | 71.9 |
| Total number of transmissions during propagation event | 11130 | 7320 | 5521 |

-continued

| Variant | Standard | No listen only period | Proposed |
| --- | --- | --- | --- |
| Transmissions per time unit immediately after propagation event | 7.00 | 7.53 | 7.03 |
| Transmissions per time unit long after propagation event (estimated) | 43 | 562 | 43 |

As can be gathered from the above results, for both the procedure without listen-only period and the proposed adaptive procedure, propagation speed is increased by roughly a factor 6. Moreover, the average number of messages per time unit during the propagation event increases by respectively a factor 4 and 3. It is to be noted however that the total number of messages sent during the entire propagation event is the lowest for the proposed adaptive procedure. Furthermore, the average number of transmissions per time unit is the same for the conventional procedure with listen-only period and the proposed adaptive procedure after the propagation event and the network has gone into maintenance mode. It is also relatively low for the algorithm without listen-only period. This is due to the fact, that because of the fast propagation event, nodes near each other are almost synchronized. This reduces the effect of the short listen problem. However, long after the propagation event, the synchronization is lost, and the algorithm without listen-only period degrades considerably. It can be concluded that the proposed adaptive approach according to the present embodiments provides both fast propagation speed and low number of redundant messages.

To summarize, a method and an apparatus for propagating and maintaining update information have been described, wherein the speed at which a Trickle algorithm can propagate update information in a multi-hop network is increased, while still controlling the number of redundant transmissions and ensuring scalability of the algorithm. This is achieved by intelligently adapting the size of a listen-only period depending on the fact if a node has recently received an update or not.

While the invention has been illustrated and described in detail in the drawings and foregoing description, such illustration and description are to be considered illustrative or exemplary and not restrictive. The invention is not limited to the disclosed embodiments. The proposed processing can be applied to any kind of message-based information to be propagated in multi-hop or mesh networks. Moreover, the specific values and rules for setting and adapting the listen-only interval, the minimum size of the listen-only interval, and the size parameter are not intended to be restrictive. They can be modified and adapted based on desired applications fields and effects of the invention.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 3 and 4 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for propagating and maintaining update information in a wireless network, said apparatus comprising:
   a transceiver for transmitting and receiving update messages;
   a timer for counting a first predetermined time period (t);
   a counter for determining a number of consistent update messages received by said transceiver during said first predetermined time period (t), said consistent update messages containing update information which corresponds to update information currently maintained at said apparatus; and
   a transmission controller for setting said first predetermined time period (t) and for resetting said timer and said counter at the start of a second predetermined time period ($\tau$) larger than or equal to said first predetermined time period (t);
   wherein said transmission controller is adapted to broadcast an own update message which contains said update information currently maintained at said apparatus, only if said timer has reached said first predetermined time period (t) and said counter has counted less than a predetermined number (k) of said consistent update messages during said first predetermined time period (t); and
   wherein said transmission controller is adapted to adjust a minimum size of said first predetermined time period (t) in dependence on a receipt of an inconsistent message which contains the update information which differs from said update information currently maintained at said apparatus.

2. The apparatus of claim 1, wherein said transmission controller is adapted to set said second predetermined time period ($\tau$) to a minimum time period ($\tau_l$) and to start a new second predetermined time period ($\tau$) in response to a receipt of said inconsistent message, and wherein said transmission controller is adapted to double the size of said second predetermined time period ($\tau$) up to a maximum time period ($\tau_h$) and to start a new second predetermined time period ($\tau$), if said timer has reached the end of said second predetermined time period ($\tau$).

3. The apparatus of claim 2, wherein said transmission controller is adapted to set said minimum size of said first predetermined time period (t) to zero if said second predetermined time period ($\tau$) is set to said minimum time period ($\tau_l$).

4. The apparatus of claim 2, wherein said transmission controller is adapted to set said minimum size of said first predetermined time period (t) to half of the size of said second predetermined time period ($\tau$) if said second predetermined time period ($\tau$) is set to a value larger than said minimum time period ($\tau_l$).

5. The apparatus of claim 2, wherein said transmission controller is adapted to set said minimum size of said first predetermined time period (t) to a value which corresponds to the size of said second predetermined time period ($\tau$) multiplied by a size parameter ($\eta$) at the start of a new second predetermined time interval, wherein said transmission controller is adapted to set said size parameter ($\eta$) to zero in response to said receipt of said inconsistent message, and wherein said transmission controller is adapted to increment said size parameter ($\eta$) by a predetermined value up to a maximum value less than or equal to one, if said timer has reached the end of said second predetermined time period ($\tau$).

6. The apparatus of claim 5, wherein said transmission controller is adapted to set said maximum value to 0.5 and to calculate said predetermined value based on the equation $\delta=1/(2 \log_2(\tau_h/\tau_l))$, wherein $\delta$ designates said predetermined value, $\tau_h$ designates said maximum time period and $\tau_l$ designates said minimum time period.

7. The apparatus of claim 1, wherein said predetermined number (k) equals one.

8. A network node comprising: an apparatus according to claim 1.

9. A mesh network comprising: a plurality of network nodes according to claim 8.

10. A method of propagating and maintaining update information at a node of a wireless network, said method comprising:
   transmitting and receiving update messages;
   counting a first predetermined time period (t);
   determining a number of consistent update messages received during said first predetermined time period (t), said consistent update messages containing update information which corresponds to update information currently maintained at said node; and
   setting said first predetermined time period (t) and resetting a timer and a counter at the start of a second predetermined time period ($\tau$) larger than or equal to said first predetermined time period (t);
   broadcasting an own update message which contains said update information currently maintained at said node, only if said first predetermined time period (t) has been reached and less than a predetermined number of said consistent update messages have been counted during said first predetermined time period (t); and
   adjusting a minimum size of said first predetermined time period (t) in dependence on a receipt of an inconsistent message which contains update information which differs from said update information currently maintained at said node.

11. A computer readable, non-transitory medium having stored therein instructions for causing a processing unit to execute a method of propagating and maintaining update information at a node of a wireless network, the non-transitory medium comprising code for:

transmitting and receiving update messages;

counting a first predetermined time period (t);

determining a number of consistent update messages received during said first predetermined time period (t), said consistent update messages containing update information which corresponds to update information currently maintained at said node; and setting said first predetermined time period (t) and resetting a timer and a counter at the start of a second predetermined time period (τ) larger than or equal to said first predetermined time period (t);

broadcasting an own update message which contains said update information currently maintained at said node, only if said first predetermined time period (t) has been reached and less than a predetermined number of said consistent update messages have been counted during said first predetermined time period (t); and adjusting a minimum size of said first predetermined time period (t) in dependence on a receipt of an inconsistent message which contains update information which differs from said update information currently maintained at said node.

\* \* \* \* \*